United States Patent
D'Angelico et al.

(10) Patent No.: US 11,740,116 B2
(45) Date of Patent: Aug. 29, 2023

(54) VIBRONIC SENSOR

(71) Applicant: Endress+Hauser SE+Co. KG, Maulburg (DE)

(72) Inventors: Sascha D'Angelico, Rümmingen (DE); Raphael Kuhnen, Schliengen (DE); Tobias Brengartner, Emmendingen (DE); Izabella Sandor, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 1169 days.

(21) Appl. No.: 16/310,616

(22) PCT Filed: May 17, 2017

(86) PCT No.: PCT/EP2017/061874
§ 371 (c)(1),
(2) Date: Dec. 17, 2018

(87) PCT Pub. No.: WO2017/215875
PCT Pub. Date: Dec. 21, 2017

(65) Prior Publication Data
US 2019/0339107 A1    Nov. 7, 2019

(30) Foreign Application Priority Data

Jun. 17, 2016 (DE) ............. 10 2016 111 134.1

(51) Int. Cl.
*G01F 23/296* (2022.01)
*G01N 9/00* (2006.01)
(Continued)

(52) U.S. Cl.
CPC ......... *G01F 23/2967* (2013.01); *G01H 11/06* (2013.01); *G01N 9/002* (2013.01);
(Continued)

(58) Field of Classification Search
CPC .... G01F 23/2967; G01H 11/06; G01N 9/002; G01N 11/16; G01N 29/42;
(Continued)

(56) References Cited

U.S. PATENT DOCUMENTS 7,436,100 B2 * 10/2008 D'Angelico ........... G01N 11/16
310/319
8,220,313 B2 * 7/2012 Lopatin ............... G01F 23/2966
73/32 R
(Continued)

FOREIGN PATENT DOCUMENTS

CN    103608651 A    2/2014
CN    105308432 A    2/2016
(Continued)

OTHER PUBLICATIONS

Search Report for German Patent Application No. 10 2016 111 134.1, German Patent Office, dated Mar. 28, 2017, 6 pp.
International Search Report for Patent Application No. PCT/EP2017/061874, WIPO, dated Aug. 21, 2017, 12 pp.

*Primary Examiner* — Lisa M Caputo
*Assistant Examiner* — Rose M Miller
(74) *Attorney, Agent, or Firm* — Mark A. Logan; Endress+Hauser (USA) Holding, Inc.

(57) ABSTRACT

The present invention relates to a vibronic sensor for determining a process variable of a medium in a containment, comprising a mechanically oscillatable unit, a driving/receiving unit and an electronics unit having an adaptive filter. The present invention relates also to a method for operating the sensor. The electronics unit is embodied alternately to execute a first operating mode and a second operating mode. The driving/receiving unit is embodied during the first operating mode to excite the oscillatable unit using an electrical excitation signal. During the second operating mode, the exciting of the oscillatable unit is interrupted and (Continued)

the oscillations of the oscillatable unit are received and transduced into an electrical, received signal. At least one filter characteristic of the adaptive filter is set such that a predeterminable phase shift is present between the excitation signal and the received signal, and the process variable is determined from the received signal.

18 Claims, 3 Drawing Sheets

(51) Int. Cl.
  *G01N 11/16* (2006.01)
  *G01N 29/42* (2006.01)
  *G01N 29/02* (2006.01)
  *G01H 11/06* (2006.01)

(52) U.S. Cl.
  CPC ............ *G01N 11/16* (2013.01); *G01N 29/42* (2013.01); *G01N 29/022* (2013.01); *G01N 2009/006* (2013.01); *G01N 2291/014* (2013.01); *G01N 2291/02818* (2013.01); *G01N 2291/02836* (2013.01)

(58) Field of Classification Search
  CPC ... G01N 2009/006; G01N 2291/02818; G01N 2291/02836; G01N 29/022; G01N 2291/014
  USPC ........... 73/54.02, 54.23, 54.24, 54.25, 54.26, 73/54.27, 54.41, 290 V, 64.53, 579
  See application file for complete search history.

(56) References Cited

U.S. PATENT DOCUMENTS

| | | | | |
|---|---|---|---|---|
| 8,322,194 B2* | 12/2012 | Muller | ................... | G01N 9/002 |
| | | | | 73/54.27 |
| 8,422,782 B1* | 4/2013 | Dhua | ................... | G06V 10/462 |
| | | | | 382/305 |
| 10,429,286 B2* | 10/2019 | Brengartner | ......... | G01N 29/036 |
| 2005/0071113 A1* | 3/2005 | Heilig | ................... | G01F 23/266 |
| | | | | 702/127 |
| 2005/0210954 A1* | 9/2005 | Raffalt | ................ | G01F 25/0076 |
| | | | | 73/1.82 |
| 2013/0036816 A1* | 2/2013 | Urban | .................... | G01F 23/296 |
| | | | | 73/290 V |
| 2016/0109285 A1* | 4/2016 | Brengartner | ........ | G01F 23/2967 |
| | | | | 702/56 |
| 2017/0343459 A1* | 11/2017 | Brengartner | ........... | G01N 9/002 |

FOREIGN PATENT DOCUMENTS

| | | |
|---|---|---|
| CN | 105424140 A | 3/2016 |
| DE | 10056353 A1 | 5/2002 |
| DE | 10161071 A1 | 6/2003 |
| DE | 10161072 A1 | 6/2003 |
| DE | 102005015547 A1 | 10/2006 |
| DE | 102007013557 A1 | 2/2008 |
| DE | 102007008669 A1 | 8/2008 |
| DE | 102009026685 A1 | 12/2010 |
| DE | 102009028022 A1 | 2/2011 |
| DE | 102010030982 A1 | 1/2012 |
| DE | 102012101667 A1 | 8/2013 |
| DE | 102014118393 A1 | 6/2016 |
| EP | 2151672 A1 | 2/2010 |
| JP | 2014002090 A | 1/2014 |

* cited by examiner

VIBRONIC SENSOR

CROSS-REFERENCE TO RELATED APPLICATIONS

The present application is related to and claims the priority benefit of German Patent Application No. 10 2016 111 134.1, filed on Jun. 17, 2016 and International Patent Application No. PCT/EP2017/061874, filed on May 17, 2017 the entire contents of which are incorporated herein by reference.

TECHNICAL FIELD

The invention relates to a vibronic sensor for determining and/or monitoring at least one process variable of a medium as well as to a method for operating the vibronic sensor.

BACKGROUND

Vibronic sensors are widely applied in process and/or automation technology. In the case of fill-level measuring devices, they have at least one mechanically oscillatable unit, such as, for example, an oscillatory fork, a single rod or a membrane. Such is excited during operation by means of a driving/receiving unit, frequently in the form of an electromechanical transducer unit, which can be, for example, a piezoelectric drive or an electromagnetic drive, to cause the mechanically oscillatable unit to execute mechanical oscillations. The mechanically oscillatable unit can in the case of flow measuring devices, however, also be embodied as an oscillatable tube, which is flowed through by the medium, such as, for example, in a measuring device working according to the Coriolis principle.

Corresponding field devices are produced by the applicant in a large number of variants and in the case of fill-level measuring devices, sold, for example, under the marks, LIQUIPHANT and SOLIPHANT. The underpinning measuring techniques are set forth, in principle, in a large number of publications. The driving/receiving unit excites the mechanically oscillatable unit by means of an electrical excitation signal to cause the mechanically oscillatable unit to execute mechanical oscillations. Conversely, the driving/receiving unit can receive the mechanical oscillations of the mechanically oscillatable unit and transduce them into an electrical, received signal. The driving/receiving unit is correspondingly provided either as a separate drive unit and a separate receiving unit, or as a combined driving/receiving unit.

Both the excitation signal as well as also the received signal are characterized by frequency, amplitude and/or phase. Correspondingly, changes of these variables are usually taken into consideration for determining the process variable of interest, such as, for example, the fill level of a medium in a container, or also the density and/or viscosity of a medium or the flow of a medium through a pipe or tube. In the case of a vibronic limit level switch for media, it is, for example, distinguished, whether the oscillatable unit is covered by the medium or is freely oscillating. These two states, the free state and the covered state, are, in such case, distinguished, for example, based on different resonance frequencies, thus based on a frequency shift. The density and/or viscosity can, in turn, be ascertained with such a measuring device only when the oscillatable unit is covered by the medium.

In such case, the driving/receiving unit is usually part of a feedback, electrical, oscillatory circuit, by means of which the exciting of the mechanically oscillatable unit to cause the mechanically oscillatable unit to execute mechanical oscillations occurs. For excitation, frequently, a predeterminable, desired value for the phase shift, thus a value for the phase shift between the excitation signal and the received signal, is set by means of a control loop. For example, for a resonant oscillation, the condition of an amplification factor ≥1, and the oscillatory circuit condition, according to which all phases arising in the oscillatory circuit add to a multiple of 360°, must be fulfilled. Known from the state of the art are the most varied of methods for exciting the mechanically oscillatable unit, and for setting a predeterminable phase shift. In such case, basically one distinguishes between an analog excitation and a digital excitation, wherein the oscillatory circuit can be of analog components, which, in each case, must be matched to the type of sensor being used, and or based on digital methods, which are, in principle, universally applicable.

An often applied excitation principle provides that the control loop for setting the predeterminable value for the phase shift between excitation signal and received signal comprises an amplifier and a phase shifter, by means of which the received signal is coupled back to the sent signal. In DE102006034105A1, for example, an adjustable phase shifter is used. The phase shifter is controlled by means of a control unit, which measures the frequency of the earlier amplified, received signal and controls at least based on stored data for the frequency phase dependence of the amplifier unit.

Known from DE102007013557A1 is, furthermore, that the amplifier has a settable amplification factor, which is set by means of a control unit in such a manner that the amplitude of the sent signal lies essentially within a predeterminable amplitude band.

Known from DE102005015547A1 is a vibronic sensor, in the case of which the electronics unit is provided with at least one all-pass filter for setting the desired value of the phase shift. The all-pass filter changes the phase of an electrical signal as a function of the frequency and at constant amplification. Especially, the all-pass filter can be controlled in such a manner that the phase between excitation signal and received signal can be set. Preferably, according to an embodiment of this invention, the received signal is only filtered and/or amplified, before it is fed to the all-pass filter, processed by such and then led back.

In the case of an analog excitation, however, the analog components, of which the oscillatory circuit is constructed, must unavoidably be matched to the type of sensor being utilized. Furthermore, the robustness of the sensor, especially with reference to external vibrations, depends on the selectivity of the filters used for signal conditioning and/or—evaluation, wherein the utilized filters determine the slope of the phase difference of the electronics unit. The greater the slope of the phase difference, the smaller is the frequency range covered by the filter. Correspondingly, it can in given cases come to the fact that the sensor no longer oscillates in resonance.

Known from DE102009026685A1 is an excitation method, in the case of which the mechanically oscillatable unit is excited by means of a so-called frequency sweep within a predeterminable frequency band in the working range of the oscillatable unit successively with discrete excitation frequencies following one another to cause the mechanically oscillatable unit to execute mechanical oscillations. The corresponding received signals are received. In such case, by means of the frequency sweep, that excitation frequency is ascertained, at which the oscillatable unit oscillates with an oscillation frequency, which corresponds to a predeterminable value for the phase shift. Then the oscillatable unit is supplied with this excitation frequency. An advantageous, further development of such method is subject matter of DE102009028022A1, in which the evaluation of the received signal is simplified by sampling and evaluating the received signal phase selectively only at certain points in time. Similarly in DE102010030982A1, it is provided to sample the received signal at discrete points in time specified relative to the sent signal, to compare the sampled voltage values of the received signal, in each case, with a desired value, which the received signal assumes at this point in time, when the predeterminable value for the phase shift is present, and, in the case of a deviation of a voltage value from the desired value, to lessen or to increase the frequency of the sent signal based on the sign of the deviation.

In the case of an excitation by means of a frequency sweep and the evaluation of a particular phase and/or amplitude of the received signals, it must, however, be heeded that there is a dependence between the scanning speed of the frequency sweep and the frequency resolution.

Another digital opportunity for a vibronic sensor to control the phase shift between excitation signal and received signal to a predeterminable value is disclosed in DE00102010030982A1. The method described there is based on the functional principle of a phase control loop, also called a phase locked loop, or PLL. In such case, the frequency of the excitation signal is set in such a manner that a predeterminable value for the phase shift exists between the excitation signal and the received signal.

This type of excitation has compared with excitation by means of a frequency sweep significant advantages as regards evaluation speed. However, at least one phase detector is required, which influences the robustness, by which is meant, among other things, especially the stability of the control in the case of the occurrence of external vibrations. Also the accuracy of the control loop can be decreased. In order that the evaluation can occur stably, it must, furthermore, be assured that the amplitude of the excitation signal is held at a constant value.

In order to reduce problems in the operation of a vibronic sensor upon the occurrence of external vibrations, such as, for example, vibrations from pumps or also ultrasonic baths, DE102012101667A1 proposes to configure a control/evaluation unit therefor, such that, in the presence of at least one external vibration, as a function of the frequency and/or the amplitude of the external vibration, the oscillation excitement is controlled in such a manner that the received signal is essentially undisturbed by the external vibration and/or at least one frequency of a external vibration is suppressed.

In order to be able to work independently of disturbing influences, the previously unpublished German patent application No. 102014119061.0 (US2017343459) provides a vibronic sensor with an electronics unit, which includes an adaptive filter. In the ongoing operation of the vibronic sensor, the filter properties are so set that a desired phase shift is present between the excitation signal and the received signal. This application is incorporated by reference in the following.

SUMMARY

Starting from the state of the art, an object of the present invention is to provide a vibronic sensor and a method for operating the sensor, which are distinguished by a high measure of reliability.

The object of the invention is achieved by a vibronic sensor for determining and/or monitoring at least one process variable of a medium in a containment, comprising
a mechanically oscillatable unit,
a driving/receiving unit, and
an electronics unit having at least one adaptive filter,
wherein the electronics unit is embodied alternately to execute a first operating mode and a second operating mode,
wherein the driving/receiving unit is embodied during the first operating mode to excite the mechanically oscillatable unit by means of an electrical excitation signal to cause the mechanically oscillatable unit to execute mechanical oscillations,
wherein the electronics unit is embodied during the second operating mode
to interrupt the exciting of the mechanically oscillatable unit by means of the excitation signal,
to receive the mechanical oscillations of the mechanically oscillatable unit and to transduce such into an electrical, received signal
to set at least one value of a filter characteristic of the adaptive filter in such a manner that a predeterminable phase shift is present between the excitation signal and the received signal, and
to determine from the received signal the at least one process variable.

Since the filter characteristic is suitably set, there results between the excitation signal and the received signal a certain, desired, predeterminable phase shift, i.e. a desired value for the phase shift.

The filter characteristic of a filter describes, quite generally, the behavior of the filter, thus its filter properties, and is determined by the filter requirements, such as the passing-, and blocking regions. In given cases, filter requirements include likewise specifications relative to group propagation time, maximum overshooting, edge steepness, center frequency, quality, etc. For example, one of the known filter characteristics, Bessel, Legendre, Butterworth, Tschebyscheff, Gauss, etc., can be used. Depending on selected filter characteristic, there can be formed for the filter a transfer function, by means of which amplitude, phase and frequency are completely determined.

The filter characteristic of an adaptive filter is adjustable during operation. Thus, for example, the quality of the filter, which correlates with the bandwidth, as well as the position of the center frequency can be set. Correspondingly, by setting a suitable filter characteristic, the phase shift $\phi_{filter}$ between the input- and output signal of the filter can be suitably set. As a consequence of setting the phase shift between the input signal and the output signal of the filter to a predeterminable value, the frequency of the excitation signal is set in such a manner that between the excitation signal and the received signal a predeterminable phase shift of $\phi_{desired}=360°-\phi_{filter}$ occurs. Since an adaptive filter is being used, thus a filter that can be modified, the quality of the filter can be increased, without limiting the particular frequency range, such as would be the case for a fixed filter. The setting of the predeterminable phase shift via the filter is advantageous largely independently of arising disturbing influences, such as, for example, external vibrations, so that the vibronic sensor of the invention operates especially robustly.

By using an adaptive filter, a field device of the invention is applicable for a large number of applications. For example, the field device can be operated at different phase setting accuracies and, associated therewith, different working velocities. Also, the setting of different values for the predeterminable phase shift is simply implementable, and can advantageously occur via software. In this way, one and the same electronics unit and arrangement can be used for different predeterminable phase shifts. The solution of the invention can, furthermore, be applied advantageously both for digital as well as also for analog embodiments of an oscillatory circuit for exciting the oscillatable unit and is adaptable simply for different sensors, especially different oscillatable units.

According to the invention, the vibronic sensor is alternately operated in a first operating mode and a second operating mode. During the first operating mode, in the following also referred to as the excitation sequence, the mechanically oscillatable unit is excited by means of the driving/receiving unit to execute mechanical oscillations. During the second operating mode, also referred to as measuring/control sequence, the exciting of the oscillatable unit is interrupted. The exciting/receiving unit is thus not supplied with the electrical excitation signal during the second operating mode. During the second operating mode, the oscillatable unit continues to oscillate with its eigenfrequency in the form of a damped oscillation. The oscillations are transduced into an electrical, received signal, from which, in turn, the at least one process variable is determined and the current phase shift between the excitation signal and the received signal controlled by suitable setting, at least of the filter characteristic, to a predeterminable value, or for a predeterminable phase shift. The excitation signal is thus produced based on the received signal.

A decisive advantage as regards the procedure of the invention, according to which two operating modes are alternately executed, lies in the feature that the detecting of the mechanical oscillations can occur in the form of the received signal and its evaluation performed independently of the excitation signal. This is especially advantageous when, for example, structurally, couplings between the excitation signal and the received signal can occur. This is the case, for example, when a superpositioning of the excitation signal and the received signal takes place.

In a preferred embodiment, the excitation signal is a rectangular signal. It is to be noted, however, that also other signal forms known to those skilled in the art for the excitation signal, such as triangular signals, sinusoidal signals, etc., are possible and fall within the scope of the present invention.

Another preferred embodiment provides that the electronics unit includes at least one switch element for the switching back and forth between the first and second operating modes. By means of the switch element, for example, the driving/receiving unit can be separated from the electronics unit.

In an especially preferred embodiment, the electronics unit is embodied to set the predeterminable phase shift by setting the center frequency of the adaptive filter. The center frequency is thus varied in such a manner that a certain, predeterminable phase shift is present between the excitation signal and the received signal.

In an additional, especially preferred embodiment, the electronics unit includes a phase control unit, especially a phase control unit based on the principle of a lock-in amplifier, which controls the center frequency of the adaptive filter in such a manner that a predeterminable value is present for the phase shift between an input signal and an output signal of the filter. The setting of the predeterminable phase shift between the excitation signal and the received signal occurs thus by means of a control of the phase shift between the input signal and output signal of the adaptive filter. Involved in the case of a lock-in amplifier is especially, in principle, an extremely narrowband bandpass filter. Correspondingly, this procedure permits a control with especially good signal-to-noise ratio.

Alternatively, another embodiment provides that the electronics unit includes a ring buffer and/or a phase shifter, by means of which the predeterminable phase shift is settable. The setting of a predeterminable value for the phase shift between an excitation signal and a received signal of a vibronic sensor by means of a ring buffer and/or phase shifter is basically described, for example, in the documents, DE10161071A1 and DE10161072A1. Referenced to the present invention, for example, discrete values of the received signal can be stored in a memory element and then transferred to the adaptive filter with a settable time delay. Then, the predeterminable phase shift between the excitation signal and the received signal results from two measures: From the phase shift between the input signal and output signal of the adaptive filter set by means of the filter characteristic, as well as from the phase shift $\phi_{rb}$ produced by means of the ring buffer and/or phase shifter. In this way, the predeterminable phase shift $\phi_{desired}$ becomes $\phi_{desired}=360°-\phi_{filter}-\phi_{rb}$. Advantageously, by this procedure, the adaptive filter can be set to its center frequency independently of the value of the predeterminable phase shift. This setting corresponds to a phase shift between the input signal and the output signal of the filter of 0° or 90°. If another value for the predeterminable phase shift between excitation signal and received signal is required, which does not correspond to a value of $\phi_{desired}=360°-\phi_{filter}$, then supplementally by means of the ring buffer and/or phase controller a suitable additional phase shift must be set, so that the required predeterminable phase shift $\phi_{desired}=360°-\phi_{filter}-\phi_{rb}$ is established.

By setting the predeterminable phase shift, the oscillatable unit executes mechanical oscillations with the corresponding frequency. Preferably, in the controlled state, the oscillatable unit executes resonant oscillations in the fundamental oscillation mode. Advantageously, by setting the center frequency to the frequency of the excitation signal, the oscillation frequency of the mechanically oscillatable unit is known. This is thus directly detected during the exciting, which means a simplification relative to the signal evaluation within the electronics unit.

In a preferred embodiment, the bandwidth and/or the quality of the adaptive filter can be set. The quality is, in such case, connected via the frequency with the bandwidth.

A large bandwidth enables finding the resonance frequency of the oscillatable unit simply and rapidly, since, in this way, the oscillatable unit is excited with frequencies within a large frequency spectrum. Advantageously, the oscillatory circuit condition can thus also be fulfilled within a broad frequency band. If, however, within a maximum, visitable frequency interval no resonance is detected, for example, a blockage and/or a defect of the mechanically oscillatable unit can be present.

In the case of a digital excitation based on the principle of a phase control loop, in contrast, the phase shift between the excitation signal and the received signal is directly controlled, which requires a settled state of the oscillatory system. The resonance frequency must thus be essentially known. Since, however, the quality of the oscillatory system can continuously change during operation, the search and control of the resonance frequency in the case of application of a phase control loop are significantly more complicated than for the case, which the present invention describes. For the present invention, for example, the center frequency of the digital filter, whose quality is constant, is controlled. Furthermore, use of at least one voltage controlled oscillator (VCO) can be avoided, because of setting the predeterminable phase shift by control of the phase shift between the input signal and output signal of the adaptive filter.

For an exact measuring, it is, in turn, expedient to choose an as small as possible bandwidth, in order to maximize the accuracy of measurement as much as possible. A small bandwidth advantageously effects a significant reduction of disturbing influences.

In a preferred embodiment, the adaptive filter is a resonator filter. In an alternative preferred embodiment, the adaptive filter is a bandpass filter, especially a low-pass filter, especially a low-pass filter of second order. If, for example, the center frequency of the adaptive filter is controlled to the input frequency, thus to the frequency of the signal received from the oscillatable unit, then there results in the case of application of a bandpass filter a phase shift $\phi_{filter}$ between input- and output signal of 0°. In the case of a low-pass filter of second order, especially with resonance increase, thus a resonator filter, in contrast, a phase shift of −90° results. Depending on the embodiment of the sensor unit, then another value results for the predeterminable phase shift between excitation signal and received signal leading to a resonant excitation.

An embodiment provides that the predeterminable phase shift is +/−90°, +/−45°, or 0°. While a predeterminable phase shift of 90° or 0°, depending on the embodiment of the sensor unit, especially the driving/receiving unit, leads to a resonant excitation of the oscillatable unit, a predeterminable phase shift of +/−45° is, in given cases, preferred for determining density or viscosity.

Another embodiment provides that the electronics unit includes an amplitude control unit for controlling the amplitude of the excitation signal to a predeterminable value or to a value within a predeterminable interval. Advantageously with an amplitude control unit, the amplitude dynamic range can be controlled. In this way, among other things, the damping of the oscillation amplitude of the oscillatable unit in the case of immersion in different media can be compensated. The oscillatable unit is thus supplied, in each case, with a signal of suitable amplitude, which is selected in such a manner that the amplitude of the received signal lies within a certain selectable interval. A control of the amplitude is correspondingly especially advantageous in a settled state of the sensor It is, moreover, advantageous that the electronics unit be embodied to execute a frequency scan, in the case of the subceeding of a predeterminable threshold value for the amplitude, to excite the oscillatable unit by means of the frequency scanning, and to set the center frequency of the adaptive filter successively within a predeterminable frequency interval to discrete excitation frequencies following one another. For example, in the operation, as soon as the predeterminable threshold value for the amplitude at the resonance frequency is subceeded, operation can be changed from phase control to a driving of the sensor using excitation by means of frequency scanning. In this regard, the center frequency of the adaptive filter is set to discrete frequencies following one after the other within a predeterminable frequency band. As soon as the threshold value for the amplitude is exceeded (thus, for example, the oscillatable unit again freely oscillates), operation can be switched back into the original mode, in which the exciting occurs by means of a predeterminable phase shift.

In an embodiment, the electronics unit is embodied to store and/or to furnish during the performance of the first operating mode at least one value and/or parameter of at least one of the components associated with the electronics unit, especially a value and/or parameter of the filter characteristic, the phase control unit or the amplitude control unit. During the first operating mode, there is thus no active evaluation of the received signal, since this couples with the excitation signal. Correspondingly, there is also no controlling of the current phase shift to the predeterminable phase shift between the excitation signal and the received signal solid. The values and/or parameters of the individual components of the electronics unit are thus virtually frozen during the duration of the first operating mode.

In this regard, it is advantageous that the electronics unit is, furthermore, embodied to set at the beginning of the performance of the second operating mode the at least one stored and/or furnished parameter and/or value for the at least one component. The second operating mode is thus, in each case, started with the values and/or parameters stored and/or furnished last during the preceding second operating mode.

Advantageously, the process variable is a specified fill level, the density and/or the viscosity of the medium in the container.

Likewise advantageous is that the oscillatable unit is a membrane, a single rod or an oscillatory fork.

Furthermore, it is advantageous that the driving/receiving unit is an electromagnetic or a piezoelectric driving/receiving unit, especially one comprising a single piezoelectric element. Especially in the case of electromagnetic driving/receiving units having at least one coil, there can, due to the forming of magnetic fields, be coupling between the excitation signal and the received signal, so that a signal evaluation can be comparatively complicated or even impossible. The same holds, depending on applied evaluation methods, also for electromechanical transducer units, which have a single piezoelectric element as driving and receiving unit. In the case of the latter driving/receiving units, the coupling forms especially when the signal evaluation occurs based on an electrical voltage.

The object of the invention is, furthermore, achieved by a method for operating a vibronic sensor for determining and/or monitoring at least one process variable of a medium in a container, especially a vibronic sensor of at least one of the preceding embodiments, wherein alternately a first operating mode and a second operating mode are executed, wherein during the first operating mode the mechanically oscillatable unit is excited by means of an electrical excitation signal to cause the mechanically oscillatable unit to execute mechanical oscillations, wherein during the second operating mode
    the exciting of the mechanically oscillatable unit by means of the excitation signal is interrupted,
    the mechanical oscillations of the mechanically oscillatable unit are received and transduced into an electrical, received signal,
    at least one value of a filter characteristic of the adaptive filter is set in such a manner that a predeterminable phase shift is present between the excitation signal and the received signal, and
    the at least one process variable is determined from the received signal.

The method of the invention is applicable both for digital as well as also for analog embodiments of an oscillatory circuit for exciting the oscillatable unit. Likewise, the method of the invention permits, dependent on the application, different phase setting accuracies to be implemented, as well as, depending on the application, different predeterminable phase shifts to be set.

The embodiments of the invention described in connection with the vibronic sensor are applicable mutatis mutandis also to the method of the invention.

BRIEF DESCRIPTION OF THE DRAWINGS

The invention as well as advantageous embodiments thereof will now be described in greater detail based on the appended drawing, the figures of which show as follows.

DETAILED DESCRIPTION

Figure 1:
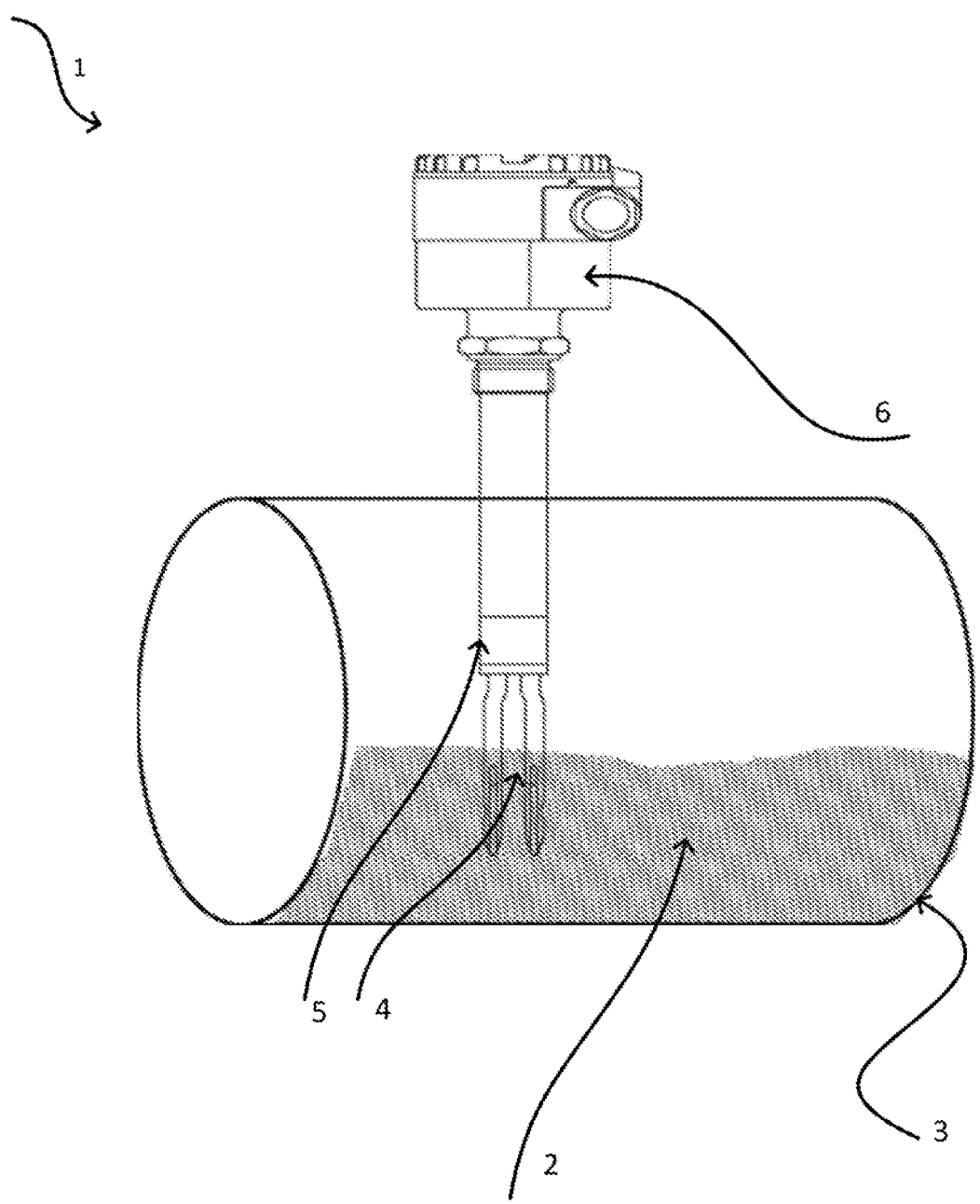
FIG. 1 shows a schematic view of a vibronic sensor according to the state of the art.

FIG. 1 shows a vibronic sensor 1. Included is an oscillatable unit 4 in the form of an oscillatory fork, which extends partially into a medium 2, which is located in a container 3. The oscillatable unit is excited by means of the exciting/receiving unit 5 to cause the mechanically oscillatable unit to execute mechanical oscillations. The exciting/receiving unit 5 can be, for example, a piezoelectric stack- or bimorph drive. It is understood, however, that also other embodiments of a vibronic sensor fall within the scope of the invention. Furthermore, an electronics unit 6 is shown, by means of which signal registration,—evaluation and/or—supply occurs.

Figure 2:
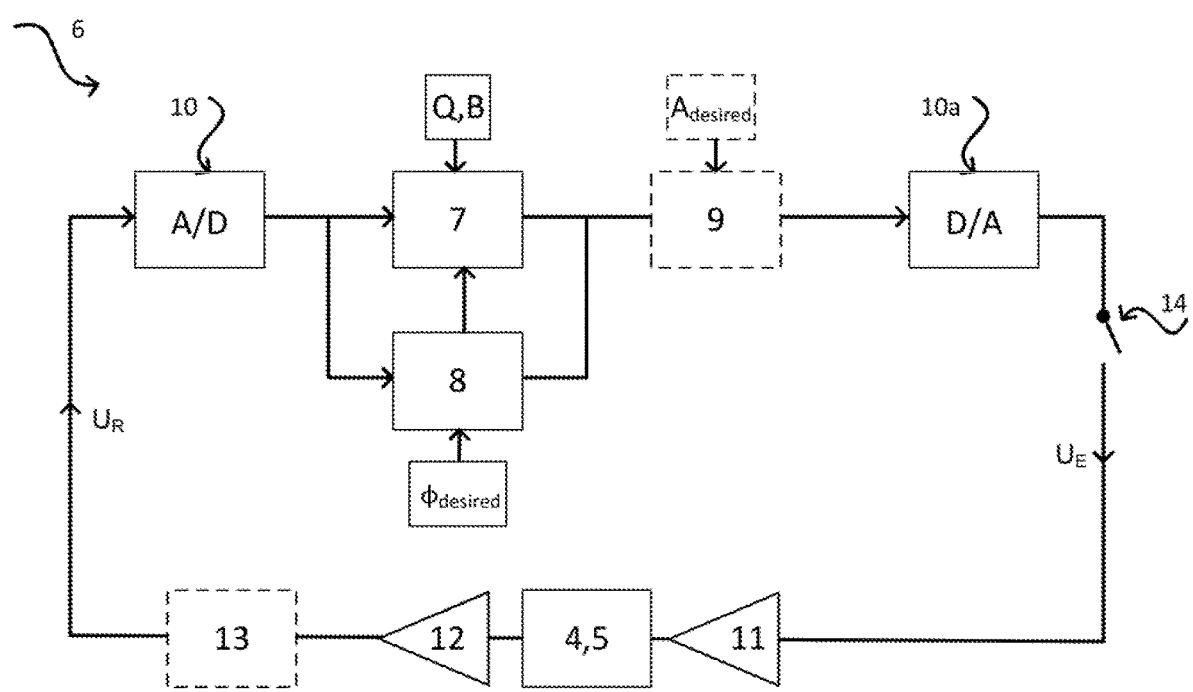
FIG. 2 shows a block diagram of an electronics unit of the invention.

A block diagram of an electronics unit of the invention is subject matter of FIG. 2. The received signal $U_R$ passes first through an analog-digital converter 10, before it is fed to the adaptive filter 7. The filter characteristic of the adaptive filter is then set such that a suitable phase shift $\phi_{filter}$ is present between the input signal and the output signal of the adaptive filter. In this way, a predeterminable phase shift $\phi_{desired} = 360° - \phi_{filter}$ results between the excitation signal and the received signal. The predeterminable phase shift is thus set by a suitable setting of the filter characteristic. For example, a phase control unit 8 can be used for this, by means of which the center frequency $f_m$ of the adaptive filter is controlled in such a manner that between excitation signal and received signal the predeterminable phase shift $\phi_{desired}$ is present. The phase control unit 8 can, in turn, be based, for example, on the principle of a lock-in amplifier.

The quality Q of the adaptive filter 7 can be set by, among others, variation of Lehr's damping ratio D. In such case, the following relationship is utilized: Q=1/2D, wherein Lehr's damping ratio is, in turn, determined from the mechanical properties of the oscillatable unit.

The quality Q of the adaptive filter 7 obeys, moreover, the relationship B=fm/Q, wherein B is the bandwidth and $f_m$ the center frequency of the adaptive filter. An embodiment of the invention provides that the quality Q of the adaptive filter 7 and/or its bandwidth B are/is settable.

The received signal $U_R$ is characterized by its frequency, its amplitude and its phase. If the phase control of the phase control unit 8 occurs by setting the center frequency $f_m$ of the adaptive filter 7 to the input frequency of the adaptive filter, then, at all times, the frequency, with which the oscillatable unit 4 oscillates, is known.

Furthermore, optionally, an amplitude control unit 9 (shown here with dashed lines) can be integrated into the electronics unit 6. By means of the amplitude control unit 9, the amplitude A of the excitation signal $U_E$ is controlled to a predeterminable value or to a value within a predeterminable interval. For example, a conventional PI-controller can be applied for this.

With the application of an adaptive filter 7 for exciting the mechanically oscillatable unit 7, advantageously, no additional filters are required for signal filtering before the evaluation.

Before being transmitted via the output stage 11 of the electronics unit to the sensor unit 4,5, the excitation signal $U_E$ passes through a digital-analog converter 10a. Optionally, the received signal $U_R$ received from the sensor unit 4,5 can, moreover, be led through an anti-aliasing filter 13, shown in dashed lines, before being forwarded to the analog-digital converter 10 after passing through the input stage 12.

For executing the two operating modes 15,16, the electronics unit includes, furthermore, a switch element 14. The processes during the two operating modes 15,16 will now be explained in the following based on FIG. 3, which shows another embodiment of an electronics unit 6 of the invention.

For this example, the driving/receiving unit 5 is an electromagnetic driving/receiving unit. This is, however, not absolutely necessary.

Figure 3A:
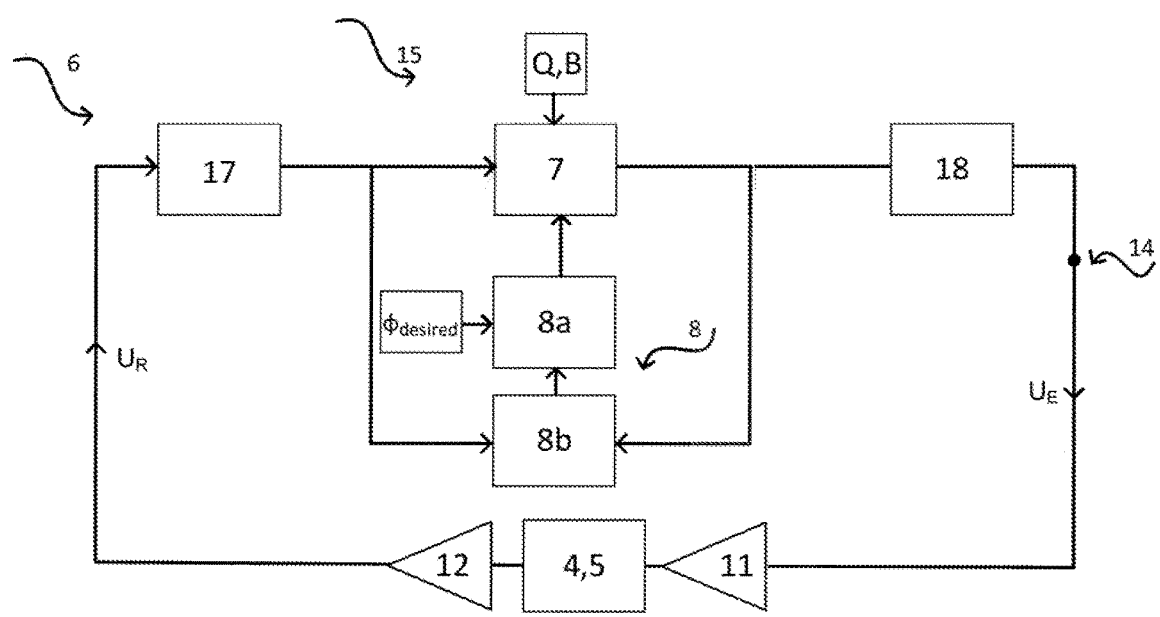
FIG. 3 shows another embodiment of an electronics unit of the invention for illustration of the (a) first and (b) second operating modes.

FIG. 3a illustrates the first operating mode 15, also referred to as the excitation sequence. The oscillatable unit 4 is supplied with an excitation signal $U_E$, in the form of a rectangular signal, and excited to execute mechanical oscillations. The oscillatable unit 4 thus stores, in this way, oscillatory energy. The received signal $U_R$ coming from the oscillatable unit 4 is superimposed on the excitation signal $U_E$. The received signal $U_R$ passes through the current-voltage converter 17, the adaptive filter 7 and the voltage-current converter 18. During the excitation sequence 15, no active measuring of the currently present phase shift $\phi$ between the excitation signal $U_E$ and received signal $U_R$ takes place. Also, no active control of at least one value of the filter characteristic of the adaptive filter 7 is performed. The components of the electronics unit 6, which serve for control and/or phase measurement, such as, for example, the adaptive filter 7, or also the control unit 8a and detection unit 8b, also referred to as the measuring unit, and the phase control unit 8, are located in a so-called hold mode, i.e. their operation is paused, or deactivated. The filter characteristic of the adaptive filter 7 remains constant. The last internal parameter and/or values of these components 8a,8b,7 set during the second operating mode 16 are stored and serve as initial values for the second operating mode 16 executed following thereon. These can be stored either within the components 8a,8b,7 or in a memory unit (not shown) associated with the electronics unit 6.

Figure 3B:
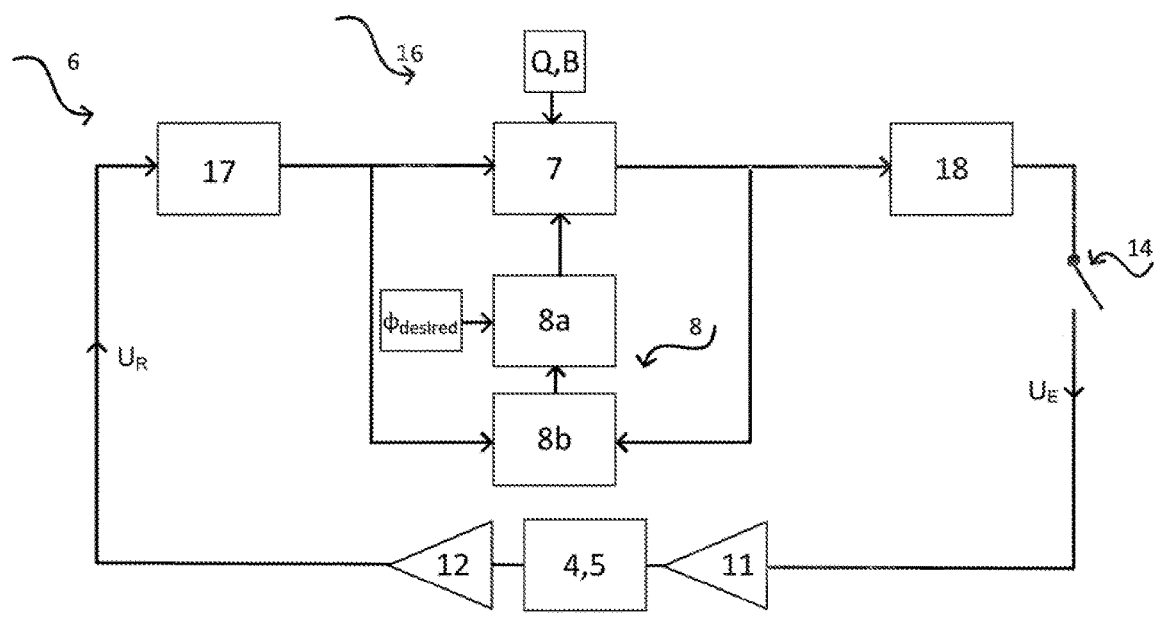

During the second operating mode 16, also referred to as the measuring/control sequence, the switch element 14 interrupts the supplying of sensor unit 4,5 by means of the excitation signal $U_E$. This is shown in FIG. 3b. The oscillatable unit 4 oscillates now with its eigenresonance frequency $f_0$ and executes correspondingly a damped resonance oscillation. The excitation signal $U_E$ is no longer superimposed on the received signal $U_R$, so that a signal evaluation can occur in the electronics unit 6. The control of the current phase shift $\phi$ between excitation signal $U_E$ and received signal $U_R$ is continued. In the case of an electromagnetic driving/receiving unit 5, for example, a predeterminable phase shift $\Delta\phi_{desired}$ of 0° is pursued. For example, the center frequency $f_m$ of the adaptive filter 7 can be set suitably for controlling the current phase shift φ. During the sequentially following measuring/control sequences 16, the internal parameters and/or values of the components 8a,8b,7 of the electronics unit 6 installed for the control and phase measurement are thus successively changed, until a resonant excitation of the sensor unit 4,5 occurs. In the settled state of the vibronic sensor 1, then phase equality is present between the excitation signal $U_E$ and received signal $U_R$, and the center frequency $f_m$ of the filter 7 is tuned to the value of the resonance frequency $f_0$ of the oscillatable unit 4. In each measuring-control sequence 6, thus, for example, the separation between the center frequency $f_m$ and resonance frequency $f_0$ is reduced.

The durations of the first 15 and second 16 operating modes are selectable and can be adapted to meet the needs of a certain sensor unit and the contemplated application of the sensor. It is to be heeded that the duration of the second operating mode be matched to the decay constant of the damped resonance oscillation of the oscillatable unit. Especially in the case of strongly damping media, it must, however, be simultaneously assured that the duration is sufficiently long, in order to assure a stable control and measuring of the phase shift between excitation signal $U_E$ and received signal $U_R$. Fundamentally, however, especially in the case of an exciting of the oscillatable unit 4 by means of a rectangular signal, it is, furthermore, advantageous that, in each case, the point in time, at which, in each case, following on the second operating mode 16, the first operating mode 15 is started, there is a matching of the oscillations of the oscillatable unit 4, so that the switching back and forth between the two operating modes 15,16 is done phase correctly. This can occur, for example, by a detecting of the zero crossings (corresponding to the rest position) of the oscillations of the oscillatable unit 4 during the second operating mode 16. For this, the electronics unit 6 can, for example, have a unit (not shown) for detecting the amplitude of the oscillations of the oscillatable unit. Such an amplitude detection unit can, for example, be integrated as a component of an amplitude control unit 9 such as shown in FIG. 2, or as separate unit.

The invention claimed is:

1. A vibronic sensor for determining a process variable of a medium, comprising:
    a mechanically oscillatable unit;
    a driving/receiving unit embodied to excite the mechanically oscillatable unit with an electrical excitation signal to cause the mechanically oscillatable unit to mechanically oscillate and further embodied to receive mechanical oscillations of the mechanically oscillatable unit and transduce the mechanical oscillations into an electrical, received signal; and
    an electronics unit including:
        an adaptive filter having an input signal and an output signal, the adaptive filter further having a filter characteristic suitable to set a phase shift between the input signal and the output signal; and
        a phase control unit configured to control the filter characteristic of the adaptive filter such that a predetermined phase shift is present between the input signal and the output signal of the adaptive filter,
    wherein the vibronic sensor is embodied to operate in a first operating mode during which:
        the driving/receiving unit excites the mechanically oscillatable unit with an electrical excitation signal to cause the mechanically oscillatable unit to mechanically oscillate;
        the phase control unit is paused; and
        the filter characteristic of the adaptive filter is held constant,
    wherein the vibronic sensor is further embodied to operate in a second operating mode during which:
        the driving/receiving unit interrupts the exciting of the mechanically oscillatable unit;
        the driving/receiving unit to receives mechanical oscillations of the mechanically oscillatable unit and transduces the mechanical oscillations into the electrical, received signal;
        to the phase control units sets a value of the filter characteristic of the adaptive filter such that the predeterminable phase shift is present between the excitation signal and the received signal; and
        the electronics unit determines from the received signal the process variable, and
    wherein the electronics unit is further embodied to execute alternately and successively the first operating mode and the second operating mode.

2. The vibronic sensor as claimed in claim 1, wherein the excitation signal is an electrical, rectangular signal.

3. The vibronic sensor as claimed in claim 1, wherein the electronics unit includes at least one switch configured to switch back and forth between the first operating mode and the second operating mode.

4. The vibronic sensor as claimed in claim 1, wherein the electronics unit is further embodied to set the predeterminable phase shift by setting a center frequency of the adaptive filter during the second operating mode.

5. The vibronic sensor as claimed in claim 1, wherein the electronics unit further includes a phase control unit is based on a principle of a lock-in amplifier, and wherein the phase control unit is configured to control a center frequency of the adaptive filter such that the predeterminable phase shift is present between the input signal and the output signal of the adaptive filter.

6. The vibronic sensor as claimed in claim 5, wherein the electronics unit further includes an amplitude control unit configured to control the amplitude of the excitation signal to a predeterminable value or to a value within a predeterminable interval.

7. The vibronic sensor as claimed in claim 6, wherein the electronics unit is embodied to store and/or to furnish a value and/or a parameter of a component of the electronics unit, including a value and/or a parameter of the filter characteristic, the phase control unit or the amplitude control unit, during the first operating mode.

8. The vibronic sensor as claimed in claim 7, wherein the electronics unit is embodied to set at the beginning of the second operating mode the stored and/or furnished parameter and/or value of the component.

9. The vibronic sensor as claimed in claim 1, wherein the electronics unit includes a ring buffer and/or a phase shifter by which the predeterminable phase shift is settable.

10. The vibronic sensor as claimed in claim 1, wherein the bandwidth and/or the quality of the adaptive filter can be set.

11. The vibronic sensor as claimed in claim 1, wherein the adaptive filter is a resonator filter.

12. The vibronic sensor as claimed in claim 1, wherein the adapter filter is a low-pass bandpass filter of second order.

13. The vibronic sensor as claimed in claim 1, wherein the predeterminable phase shift is, at times, +/−90°, +/−45° or 0°.

14. The vibronic sensor as claimed in claim 1, wherein the electronics unit is embodied to execute a frequency scan, in the case of subceeding a threshold value for an amplitude, to excite the oscillatable unit using the frequency scanning, and to set a center frequency of the adaptive filter successive within a predeterminable frequency interval to discrete excitation frequencies following one another.

15. The vibronic sensor as claimed in claim 1, wherein the process variable is a fill level, a density, and/or a viscosity of the medium.

16. The vibronic sensor as claimed in claim 1, wherein the mechanically oscillatable unit is a membrane, a single rod, or an oscillatory fork.

17. The vibronic sensor as claimed in claim 1, wherein the driving/receiving unit is an electromagnetic or a piezoelectric driving/receiving unit.

18. A method for operating a vibronic sensor for determining a process variable of a medium, comprising:
   providing the vibronic sensor, including:
      a mechanically oscillatable unit;
      a driving/receiving unit embodied to excite the mechanically oscillatable unit with an electrical excitation signal to cause the mechanically oscillatable unit to mechanically oscillate and further embodied to receive mechanical oscillations of the mechanically oscillatable unit and transduce the mechanical oscillations into an electrical, received signal; and
      an electronics unit including:
         an adaptive filter having an input signal and an output signal, the adaptive filter further having a filter characteristic suitable to set a phase shift between the input signal and the output signal; and
         a phase control unit configured to control the filter characteristic of the adaptive filter such that a predetermined phase shift is present between the input signal and the output signal of the adaptive filter;
   during a first operating mode of the vibronic sensor:
      exciting the mechanically oscillatable unit with the electrical excitation signal to cause the mechanically oscillatable unit to mechanically oscillate;
      pausing the phase control unit; and
      holding constant the filter characteristic of the adaptive filter; and
   during a second operating mode of the vibronic sensor:
      interrupting the electrical excitation signal and thereby interrupting the exciting of the mechanically oscillatable unit;
      receiving the mechanical oscillations of the mechanically oscillatable unit and transducing the mechanical oscillations into the electrical, received signal;
      controlling the filter characteristic of the adaptive filter such that the predeterminable phase shift is present between the excitation signal and the received signal; and
      determining the process variable from the received signal; and
   executing alternately and successively the first operating mode and the second operating mode.

* * * * *